United States Patent [19]

Bishop

[11] Patent Number: 5,018,695
[45] Date of Patent: May 28, 1991

[54] DISPOSABLE COASTERS

[76] Inventor: Willis E. Bishop, 21639 Lost River Dr., Diamond Bar, Calif. 91765

[21] Appl. No.: 363,485

[22] Filed: Jun. 8, 1989

[51] Int. Cl.$^5$ ............................................. A47B 91/00
[52] U.S. Cl. .................... 248/346.1; 248/146
[58] Field of Search .................. 248/346.1, 146, 152; 215/100.5; 220/212, 85 H; 428/211

[56] References Cited

U.S. PATENT DOCUMENTS

| 2,680,931 | 6/1954 | Champion | 248/346.1 |
|---|---|---|---|
| 2,727,645 | 12/1955 | Dore | 248/346.1 UX |
| 2,856,727 | 10/1958 | Tolbert | 248/346.1 |
| 3,086,314 | 4/1963 | Pender | 248/346.1 |
| 3,847,324 | 11/1974 | Uchanski | 248/346.1 X |
| 4,137,356 | 1/1979 | Shoemaker | 428/211 |
| 4,756,497 | 7/1988 | Lan | 220/85 H X |
| 4,759,451 | 7/1988 | Apps | 211/194 X |
| 4,759,525 | 7/1988 | Cross | 248/346.1 |
| 4,858,872 | 8/1989 | Witt | 248/146 |
| 4,858,873 | 8/1989 | Wilmoth | 215/100.5 |

Primary Examiner—J. Franklin Foss
Attorney, Agent, or Firm—Boniard I. Brown

[57] ABSTRACT

A coaster for use underneath liquid containers, such as drinking glasses, beverage cans, etc., comprises an upper pad formed of a liquid-absorbent material and a lower pad formed of a thermal insulating material. The two pads are separated by a liquid barrier material so that the insulating pad is maintained in a dry operable condition. A series of adhesive patches are arranged on the upper face of the coaster, whereby the coaster can be releasably attached to the bottom surface of a liquid container.

20 Claims, 2 Drawing Sheets

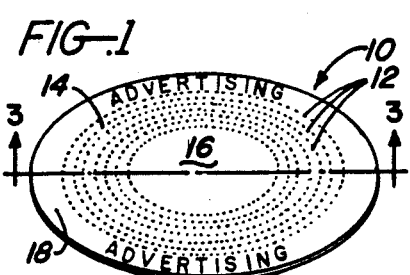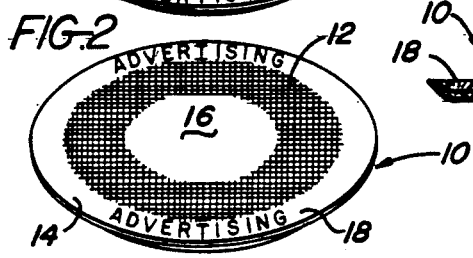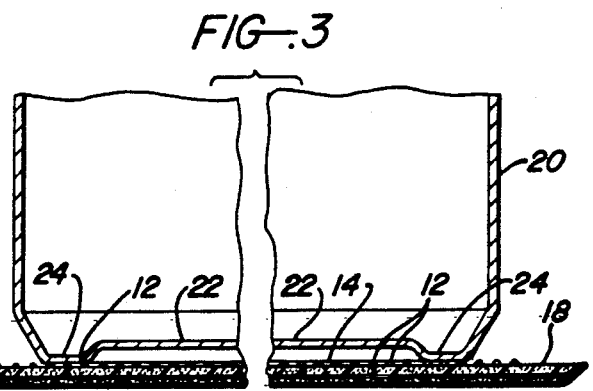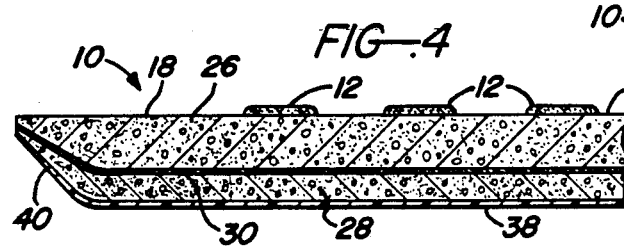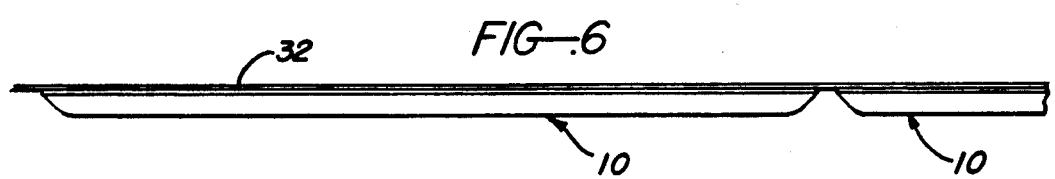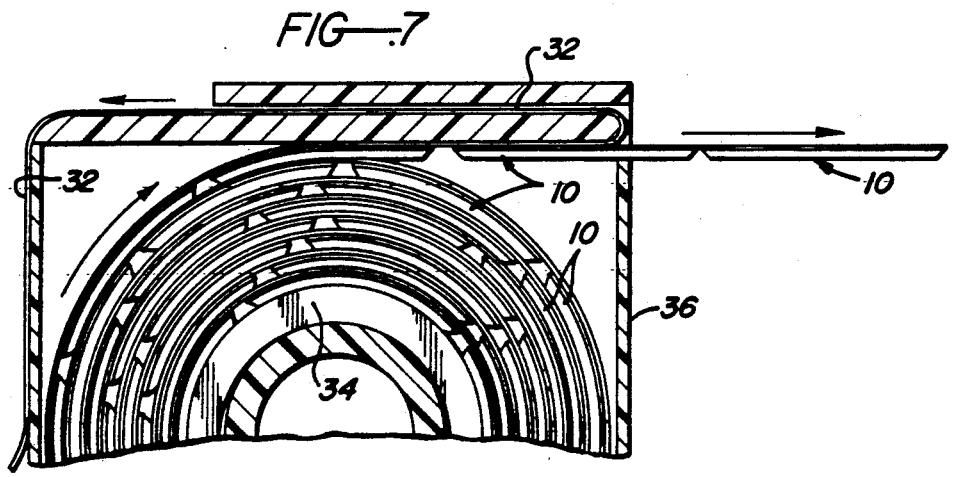

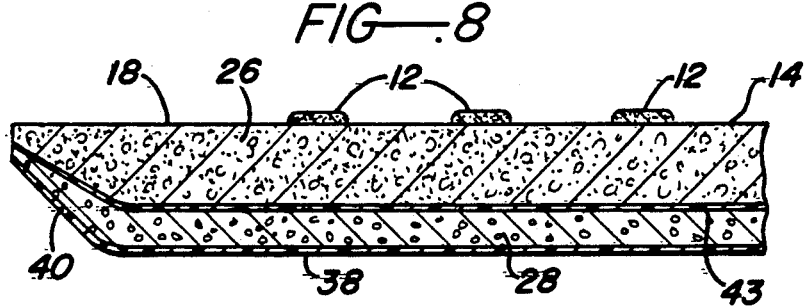
FIG—.8
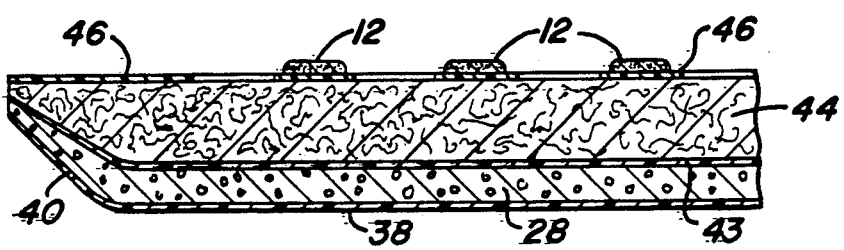
FIG—.9
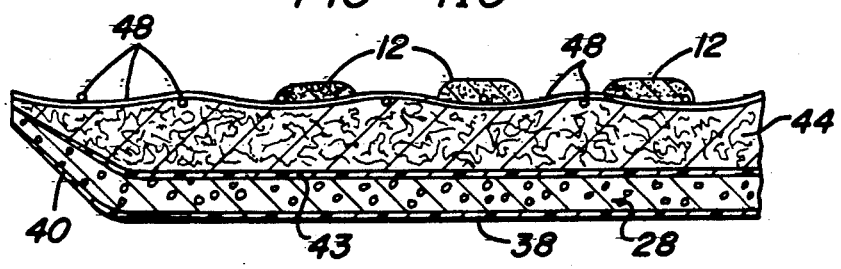
FIG—.10
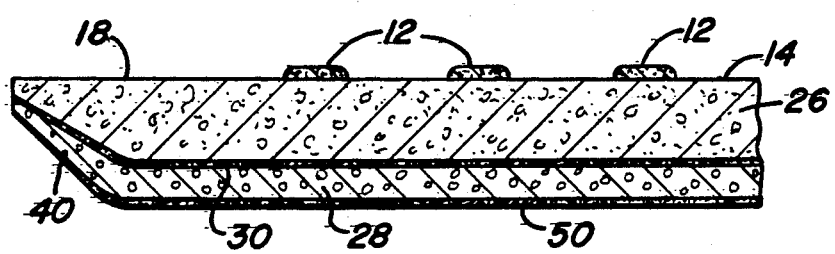
FIG—.11
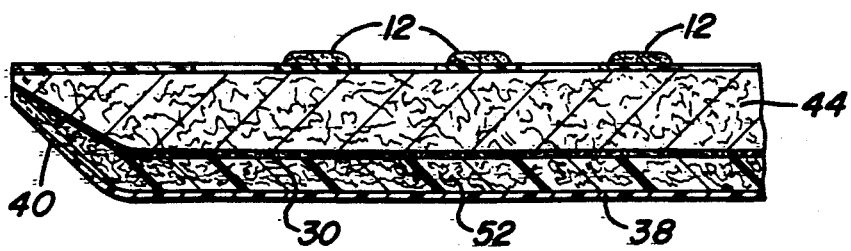
FIG—.12

DISPOSABLE COASTERS

BACKGROUND AND SUMMARY OF THE INVENTION

The present invention relates to disposable coasters usable underneath liquid containers, such as drinking glasses, beer cans, soft drink cans, pitchers, beer mugs, goblets, coffee cups, tea cups, etc. Such coasters serve a useful purpses, especially when the associated container contains a cold liquid. The cold liquid within the container causes moisture in the surrounding atmosphere to condense on the container outer surface and run down that surface onto the coaster. The liquid (water) collects on the coaster instead of flowing onto a table surface or dripping onto a person's clothing or onto the floor.

It is believed that for a coaster to be as effective as possible it should be capable of being adhered to the bottom surface of the container so that it will perform its condensate-collection function continuously, both while the container is at rest on a table surface and also when the container is being held in the person's hand above the table surface. Also, the coaster should be formed at least partially of a liquid-absorbing material so that liquid migrating onto the coaster surface will not be thrown or dislodged from the coaster when the container is moved around.

Coasters having some desired properties are already known. U.S. Pat. No. 2,004,166 to Low shows a coaster construction that includes an upper layer 8 formed of liquid-absorbent blotting paper, a lower layer 6 of liquid absorbent blotting paper, and an intervening glue film 7 between the two layers. Upper layer 8 will soak up condensate that forms on the outer surface of the associated container, and lower layer 6 will soak up water that may tend to form on the table surface. Especially in the case of containers containing cold liquids, the lower face of the coaster may be relatively cold, such that atmospheric moisture can condense at the table-coaster interfaces. Absorbent layer 6 of the coaster will tend to absorb such condensed moisture.

The coaster shown in Low U.S. Pat. No. 2,004,166 is not designed to adhere itself to the bottom surface of the associated liquid container. Thus, a person using the coaster must make a conscious effort to return the container to a position on the coaster after each sip of liquid; otherwise, condensate on the container surface will be apt to be thrown onto the person's clothing or onto the table surface.

Some difficulty would be encountered if it were desired to redesign the Low coaster so that it can adhere to a bottom surface of a container. Blotting paper has a very low wet strength. Therefore, if a film of adhesive were to be provided on the upper face of layer 8 of the Low coaster the coaster would nevertheless probably, in many instances, tear apart and separate from the container, leaving a glue film on the container surface. Also, the presence of a glue film between the container and coaster surfaces would constitute a barrier to flow of condensate from the container onto the moisture-absorbing area of the coaster.

U.S. Pat. No. 2,014,268 to Tenney discloses a coaster that includes an upper layer of 4 of glazed paper, three intermediate layers 7 formed of felt, sponge or blotting paper, and a bottom layer 6 of glazed paper. The intermediate layers 7 are of progressively increasing diameter so that condensate can flow radially outwardly from non-absorbant layer 4 onto peripheral edge areas of layers 7 for absorption therein.

Tenney indicates that moisture on the upper surface of his layer 4 can serve to adhere the coaster to the container bottom surface. Such might be the case if the container has a flat bottom surface that provides substantial contact area in engagement with the coaster surface, as shown in FIG. 1 of the Tenney drawings. Sufficient adherence could often not be obtained when the container has a recessed or non-flat lower face, as is often in the case.

Layer 4 in the Tenney coaster is moisture-impervious, such that condensate must flow off layer 4 onto edge areas of layers 7 in order to be absorbed into the coaster. The layers 7 apparently must have a stepped configuration, as shown in FIG. 3 of the Tenney drawings. Consequently, the coaster is required to have a diameter that is considerable larger than the diameter of the associated container.

U.S. Pat. No. 2,131,878 to Lawrence shows a coaster that includes an annular pad 12 of blotting paper or some absorbent fibre or fabric. An adhesive fabric layer 22 is secured to the lower face of pad 12; two crossing slots 26 are formed in adhesive layer 22, such that the central portion of layer 22 can be manually pushed upwardly through the large opening in pad 12 into adherent contact with the lower face of a liquid container.

The central opening in pad 12 subtracts substantially from the volume of pad 12 that could otherwise serve for condensate absorption. The Lawrence arrangement suffers also in that in many cases, a person might be unaware of the exact "push up" procedure required to adhere the coaster onto the container; additionally, it might prove inconvenient for the person to exert a push-up force on adhesive layer 12 after the container has been filled with liquid, because the filled container would be apt to spill liquid during manipulation of the container in one hand and the coaster in the other hand.

Another patent disclosing an adhesively-coated coaster is U.S. Pat. No. 2,163,309 issued to McConnell. The McConnell patent discloses a coaster formed out of several layers of soft paper napkin material 10. Slits 15 and 16 are formed in the coaster to permit the central area of the coaster to be pushed upwardly against the bottom surface of a liquid container, as shown in FIG. 3 of the McConnell drawings. A pressure sensitive adhesive 14 is disposed on the central area of the coaster to achieve adherence between the coaster and the container. The McConnell coaster design appears to be similar to the design shown in Lawrence U.S. Pat. No. 2,131,878, at least from a functional or operational standpoint.

The coaster of the present invention differs from the coaster of the above-referenced patents. My proposed coaster comprises an upper pad formed at least partly of moisture-absorbent material. The upper face of the pad has a large number of small adhesive patches extending in an annular ring pattern concentric with the pad central axis. The individual adhesive patches may be of any configuration and are spaced apart so that when the coaster is secured to the lower face of a liquid container, condensate will readily flow from the container surface into the pad via the adhesive-free areas of the pad upper face. Preferably, the adhesive patches are large in number and are such that a large number of potential liquid paths are provided through the intervening adhesive-free areas. The entire volume of the pad is available for liquid-absorbing purposes.

My proposed coaster includes a second lower pad formed of a thermally insulating material—e.g., a closed cell plastic foam material. This second pad may be bonded to the lower face of the upper pad by a liquid-impervious bonding agent applied as a continuous film across the interface between the two pads. The bonding agent acts as a barrier against downflow of liquid from the upper pad to the lower pad, whereby the lower pad remains in an essentially dry condition wherein it provides a relatively good insulating action.

This second pad is especially useful when the coaster is used with containers containing cold liquids. The pad insulates the subjacent table surface for the cold container temperature, and thus inhibits the formation of atmospheric condensate on the table surface. If the container contains hot liquid, the lower pad will insulate the liquid from the table surface and thus prevent surface damage due to excessive heat. The lower pad is mot useful when the container contains cold liquids because the pad prevents the formation of condensate on the table surface.

The second pad is not necessary for coasters used with hot dring containers, except as mentioned above, or in low-humidity climate areas where only minimal condensate is formed on cold drink containers. If a second lower pad is not used, only a waterproof film need be provided on the bottom of the first pad.

The coaster is designed so that a number of the coasters may be packaged together for sale as a unit package. The coasters may be stacked one atop another in a multi-layer three dimensional configuration. Alternately, the coasters may be adhered to a backing sheet. The backing sheet and attached coasters may be packaged in a flat configuration or rolled into a sprial package configuration suitable for being dispensed, one at a time, for a roll-type dispenser box.

When the coasters are packaged in a multi-layer three dimensional configuration, the adhesively-coated upper face of each coaster is facially engaged with the lower face on each superjacent coaster. The adhesives on the individual coasters thus hold the coasters together in the desired stack configuration. To enable individual coasters to be peeled off (separated) from the package when needed, the lower faces of the coasters will be coated with an adhesive release agent, such as a silicone coating or the like. The silicone fluid viscosity will be selected to achieve only a partial release of the adhesive action, such that individual coasters can be readily separated from the stack without causing premature separation of all coasters in the stack.

BRIEF DESCRIPTION OF THE DRAWINGS

FIG. 1 is a perspective view of a coaster according to the invention;

FIG. 2 is a perspective view of another coaster embodying the invention;

FIG. 3 is an enlarged view taken on line 3—3 in FIG. 1, and showing the coaster adhered to the bottom surface of a beverage container;

FIG. 4 is an enlarged fragmentary sectional view of the coaster of FIG. 3;

FIG. 5 is an elevational view of a stack of coasters according to FIGS. 1 and 3;

FIG. 6 is an elevational view of coasters adhesively attached to a backing sheet;

FIG. 7 is a partial sectional view of coasters on a backing sheet rolled into a spiral package within a dispenser box;

FIGS. 8 through 12 are views, similar to the view of FIG. 4, illustrating alternative forms of the invention.

DESCRIPTION OF PREFERRED EMBODIMENTS OF THE INVENTION

FIG. 1 shows a coaster 10 having a large number of small adhesive patches 12 arranged in a pattern of rings on the coaster upper face 14; other adhesive patch patterns can be used. Central area 16 of the coaster upper face is devoid of adhesive patches, as is the outer peripheral edge area 18. The adhesive patches are concentrated in an imaginary ring whose outer diameter is slightly greater than the outer diameter of a typical container–e.g., a drinking glass, or a beer can, or a coffee cup. FIG. 3 shows the coaster of FIG. 1 adhered to the bottom surface of a typical cold wet beverage container 20. The adhesive patches 12 are formed of a contact, pressure sensitive, hightack adhesive, such that when the cold wet container is placed on the coaster in approximate alignment with the coaster central axis the coaster will stick to the container, with a relatively small peripheral area 18 of the coaster protruding beyond the container side surface. The protruding area of the coaster may have thereon an advertising message.

The coaster will remain adhered to the container while a person is drinking liquid from the container. However, the adhesive force is so light that the person can easily remove the coaster from the container if he should so desire. The contact adhesive will be water resistant, such that water flowing from the container onto the adhesive patches will not unduly weaken the adhesive bonds.

As shown in FIG. 3, the container bottom surface is not flat, but has an upwardly recessed central area 22 and an annular downwardly protruding area 24. The contact adhesive patches engage annular surface area 24, to thereby adhesively secure the coaster to the container.

FIG. 1 shows the adhesive patches as a series of spaced-apart adhesive dots. FIG. 2 shows the adhesive patches as a number of thin adhesive strips extending crosswise of one another. Other discrete adhesive configurations can be used. The total surface area covered by the ahesive is only a small fraction of the total area of the adhesive ring pattern. The ring area will consist largely as an adhesive-free surface.

The upper face 14 of the coaster is defined by a circular pad 26 formed out of an open-celled plastic foam material having the ability to absorb and retain liquid therewithin. To improve its water-capturing capability the pad may be first immersed in a liquid bath of surfactant material (e.g., a wetting agent). When the coaster is adhered to the bottom of a container of cold liquid, pop, beer, etc., the porous sponge-like pad 26 will capture any condensate that forms on the outer surface of the container and runs down the container surface onto pad upper face 14. Since adhesive patches 12 are small in size and large in number, a relatively large number of adhesive-free spaces are provided on face 14 for passage of liquid into pad 26. The container does not have to be precisely positioned on the coaster in order for pad 26 to perform its water-absorption function.

The coaster includes a second lower pad 28 formed of a closed-cell plastic foam material having the ability to act as a thermal barrier. Pad 28 will thermally shield container 20 from any surface on which the associated coaster is placed—e.g., a table top surface. Therefore, the table top surface temperature will be different from the container 20 surface temperature. If the container contains cold liquid, the table top surface will have a higher temperature than the container surface, whereas if the container contains hot liquid (e.g., hot coffee) the table top surface will have a lower temperature than the container surface.

The thermal barrier action provided by lower pad 28 is especially useful when container 10 contains a cold liquid. The table top surface is maintained sufficiently high as to inhibit or prevent condensation of atmospheric moisture at the interface between the table top and lower face of pad 28.

To recapitulate, upper pad 26 captures condensate generated on the surface of container 20, whereas pad 28 thermally isolates the cold container from the subjacent table top surface, thus to prevent condensation on the bottom face of the coaster or the table top surface.

In order for pad 28 to function efficiently as a thermal barrier it should remain in an essentially dry condition. Consequently, any condensate in pad 26 should be retained in pad 26 and not allowed to migrate downwardly into pad 28. The interface between the two pads may include an adhesive bonding agent 30 extending entirely along the pad-to-pad interface. Bonding agent 30 can be any adhesive that is compatible with the materials used for pads 28 and 26, and which is not water soluble.

The illustrated coaster will typically be marketed in package form. FIG. 5 shows a coaster package wherein the individual coasters 10 are stacked one atop another. FIG. 7 shows a coaster package wherein individual coasters are temporarily affixed to a backing sheet 32 and wound in spiral fashion about a mandrel 34 within a dispenser box 36.

When the individual coasters are stacked on one another, as shown in FIG. 5, the upper faces of individual coasters will be engaged with the lower faces of superjacent coasters. Adhesive patches 12 on the coaster upper faces will serve as a bond between adjacent coasters, such that the coaster assembly will form a unitary one piece package. Some type of transparent wrapping material or box (not shown) may be used about the FIG. 5 assembly to maintain it clean at the point of sale.

There is some possibility that adhesive patches 12 could form excessively strong bonds between adjacent coasters in the FIG. 5 package; such strong bonds could make it unduly difficult for the average user to pry individual coasters off of the coaster stack. To avoid such a situation, the lower face of each coaster may have thereon a thin film of thermoplastic material 38. The lower exposed face of film 38 has a glossy adhesive release agent sprayed or otherwise formed thereon. A preferred release agent is a colorless silicone coating of a type used on pressure sensitive labels to prevent them from sticking together when packaged.

Film 38 gives the lower face of pad 28 a smoother stronger, more peel-resistant surface than can be obtained from a foam material. The smoother surface presents less total surface area ot the adhesive patches 12. The presence of the silicon release agent enables adhesive patches 12 to exert relatively small adhesion forces on the pad 28 (silicone) surface.

Removal of individual coasters from the FIG. 5 coaster stack is also facilitated by forming each coaster with a peripheral edge which is inclined upwardly and outwardly, as at 40 in FIG. 4. The outer edge of the coaster is tapered in an upward direction so that when a number of coasters are stacked together (FIG. 5) an annular clearance groove 42 is formed between adjacent coasters. A person can insert the tip of a finger into the groove to pry an individual coaster from the stack.

The tapered edge 40 can be formed incident to the step of stamping individual coasters from a multi-lamination sheet. Thus, a sheet of open-celled foam can be bonded to a sheet of closed-cell foam material, and then fed into a set of cutting dies which are configured to act as a press. As the multi-laminated sheet is cut into individual circular coasters, the press action forms the tapered edge 40.

Upwardly tapered edge 40 is useful in confining condensate within pad 26. As shown in FIG. 4, the water-impervious bonding film 30 curves upwardly near the outer peripheral edge of the coaster to act as a dam for liquid located within the pores of pad 26.

FIGS. 6 and 7 show a series of adhered to one face of a backing sheet 32 by the adhesive patches 12 on the upper face of each coaster. The backing sheet may be a strip of material slighly wider than the diameter of each coaster, such that a single row of coasters can be accommodated on the strip. As shown in FIG. 7, the strip can be rolled into a spiral configuration within a dispenser box 36. The coasters may be individually dispensed from box 36 (FIG. 7) by drawing sheet 32 out of the box, the coasters coming out along with the sheet. Alternately, the backing sheet can be wider to accommodate more than one row of coasters. The sheet-coaster assemblies can be packaged in layers or folded in sinuous fashion. When the coasters are packaged in the manner shown in FIG. 6 or FIG. 7, it is not necessary that the coasters have the release coating thereon.

FIG. 4 shows one form of the invention and other forms are shown in FIGS. 8 through 12. FIG. 8 is generally similar to FIG. 4, except that the adhesive bonding agent 30 is replaced by a thin thermoplastic film (sheet) 43.

FIG. 9 differs from the FIG. 4 construction with respect to the materials used for the liquid-absorbent pad. In the FIG. 9 arrangement the liquid-absorbent pad is comprised of a relatively thick layer of blotting paper 44 and a foraminous reinforcement film 46 bonded to the upper face of paper layer 44. Film 46 prevents the blotting paper from fragmenting or tearing apart when it becomes soaked with water, blotting paper having a relatively low wet strength. However, by bonding the blotting paper to a foraminous reinforcement film 46 the configurational integrity of the blotting paper is maintained, even after it has been saturated with water. Adhesive patches 12 are preferably located on the exposed face of reinforcement film 46, rather than on the upper face of blotting paper layer 44. Plastic film 46 is perforated so that the perforation area is high in relation to the film area. Individual perforations are preferably relatively small.

FIG. 10 is similar to FIG. 9 except for the nature of the reinforcement material used to reinforce blotting paper layer 44. In FIG. 10, the blotting paper is reinforced by a layer of gauze-like woven fabric 48. The fabric has a relatively open weave, such that there is a relatively high ratio of open area to thread area.

The reinforcement structures 46 and 48 (FIGS. 9 and 10) are selected for their ability to retain the blotting paper layer 44 intact after becoming soaked with water. Another criteria is that the reinforcement structures have sufficient porosity to conduct condensate into the blotting paper, while having sufficient surface area to anchor the adhesive patches 12 thereon.

The structure shown in FIG. 11 is similar to the FIG. 4 structure, except that the adhesive release agent is applied directly to the lower face of foam pad 28. The FIG. 11 structure does not include the thermoplastic film covering 38 on the pad lower face. Numeral 50 in FIG. 11 denotes the adhesive release agent (e.g., silicon fluid).

If the FIG. 11 coasters are to be sold in stacked form (FIG. 5), the exposed face of pad 28 will be coated with silicone fluid release agent 50. Otherwise, the release agent is unnecessary.

FIG. 12 shows a construction that is similar to FIG. 9, except that the closed-cell foam pad 28 is replaced by a thick paperboard (cardboard) pad 52. Pad 52 has some insulation properties if made out of a relatively thick cardboard material. The closed-cell foam material (FIGS. 4, 8, 9, 10, and 11) is the preferred insulating material, but thickened cardboard can also be used, providing a waterproof barrier is used between layer 44 and the cardboard pad 52.

The drawings show forms of the invention which can employ a range of different materials, and different material combinations. A common feature of the various embodiments is that in each case the coaster includes an upper pad of liquid-absorbent material and a lower pad of thermal insulation material. The two pads are separated by a barrier material that prevents liquid absorbed into the upper pad from flowing downwardly into the lower pad. The exposed upper face of the upper pad has a large number of spaced adhesive patches thereon, such that when the coaster is adhered to the bottom face of a liquid container, condensate formed on the container surface will be enabled to gravitate downwardly into the coaster without obstruction from the adhesive.

Thus there has been shown and described novel disposable coasters which fulfill all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:
1. A coaster comprising:
   a first flat imperforate pad formed of a moisture-absorbent material that has the ability to absorb and retain liquid therewithin, said first pad having a flat upper face and a lower face,
   a large number of small size contact adhesive patches extending across the upper face of said first pad inwardly from the peripheral edge of the first pad, the spaces between the adhesive patches being such that when the upper face of the first pad is adhesively secured to the lower face of a liquid container condensate will readily flow from the container surface into the first pad via the adhesive-free areas of the pad upper face, said first pad having liquid-reception pores spread across its entire upper face to facilitate downflow of liquid into the pad,
   a liquid-impervious bonding film covering the lower face of the first pad, whereby liquid absorbed into the first pad is prevented from escaping through its lower face, and
   a second imperforate pad having an upper face thereof adhered to the lower face of the first pad via said bonding film, said second pad being formed of a thermal insulation material and having sufficient thickness to act as a thermal barrier, whereby when said first pad is adhered to the lower face of a container containing a cold liquid the lower face of said second pad will have a higher temperature than the first pad.

2. The coaster of claim 1, and further comprising:
   a glossy smooth-surfaced adhesive release agent on the lower face of the second pad, whereby a plurality of such coasters can be stacked one atop another and manually peeled apart.

3. The coaster of claim 2, wherein:
   said release agent is a silicone coating, and
   the adhesive patches are formed of a high tack pressure-sensitive adhesive.

4. The coaster of claim 1, wherein:
   the peripheral edge section of the second pad and bonding film is tapered upwardly and outwardly to form a dam about the peripheral edge of the first pad.

5. The coaster of claim 1, wherein:
   said adhesive patches are discretely arranged in a pattern and size-related to the tackiness of the adhesive being used.

6. The coaster of claim 1, wherein:
   said adhesive patches are distributed over an annular section of the upper face of the first pad, said patches having a total area substantially less than half the area of said annular section.

7. The coaster of claim 1, wherein:
   said first pad is formed of an open-celled plastic foam material.

8. The coaster of claim 1, wherein:
   said second pad if formed of a closed cell plastic foam material.

9. The coaster of claim 1, wherein:
   said second pad is formed of cardboard.

10. The coaster of claim 1, wherein:
    said first pad is formed of a material that retains its integrity when wet.

11. The coaster of claim 1, wherein:
    said first pad is comprised of blotting paper, and
    said second pad is comprised of cardboard.

12. The coaster of claim 11, and further comprising:
    a glossy smooth-surfaced adhesive release agent on the lower face of the cardboard pad, whereby a plurality of the claimed coasters can be stacked one atop another and manually peeled apart.

13. The coaster of claim 1, wherein:
    said first pad is comprised of a lower layer of blotting paper and an upper layer of a perforated non-absorbent reinforcement material that is effective to prevent the blotting paper from being torn apart after it is soaked with liquid.

14. The coaster of claim 13, wherein:
    said reinforcement material has a high wet strength and a capability for good bonding with the adhesive patches.

15. The coaster of claim 14, wherein:
    said upper layer is formed of a porous woven fabric having a high ratio of open area to thread area.

16. The coaster of claim 14, wherein:
said upper layer is formed of a perforated plastic film wherein the perforation area is high in relation to the film area.

17. A coaster comprising:
a first pad formed of an open-celled plastic foam material that has the ability to absorb and retain liquid therewithin, said first pad having an upper face and a lower face,
a large number of small size contact adhesive patches extending across the upper face of said first pad inwardly from the peripheral edge of the first pad and an advertising message extending along the upper face of said first pad near the pad peripheral edge, the spaces between the adhesive patches being such that when the upper face of the first pad is adhesively secured to the lower face of a liquid container condensate will readily flow from the container surface into the first pad via the adhesive-free areas of the pad upper face,
a liquid-impervious bonding agent covering the lower face of the first pad, whereby liquid absorbed into the first pad is prevented from escaping through its lower face,
a second pad having an upper face thereof adhered to the lower face of the first pad via said bonding agent, said second pad being formed of a closed cell plastic foam-material having the ability to act as a thermal barrier, whereby when said first pad is adhered to the lower face of a container containing a cold liquid the lower face of said second pad will have a higher temperature than the first pad.

18. The coaster of claim 17, and further comprising:
an adhesive release agent covering the lower face of said second pad.

19. The coaster of claim 18, wherein:
said release agent is a silicone coating.

20. The coaster of claim 17, wherein:
said pads have their peripheral edge areas inclined upwardly and outwardly, whereby the liquid-impervious bonding agent between the pads acts as a dam to prevent condensate in the first pad from overflowing into the second pad.

* * * * *